July 5, 1949.　　　　R. R. THALNER　　　　2,475,063
REGULATED HIGH-VOLTAGE APPARATUS
Filed Feb. 24, 1944
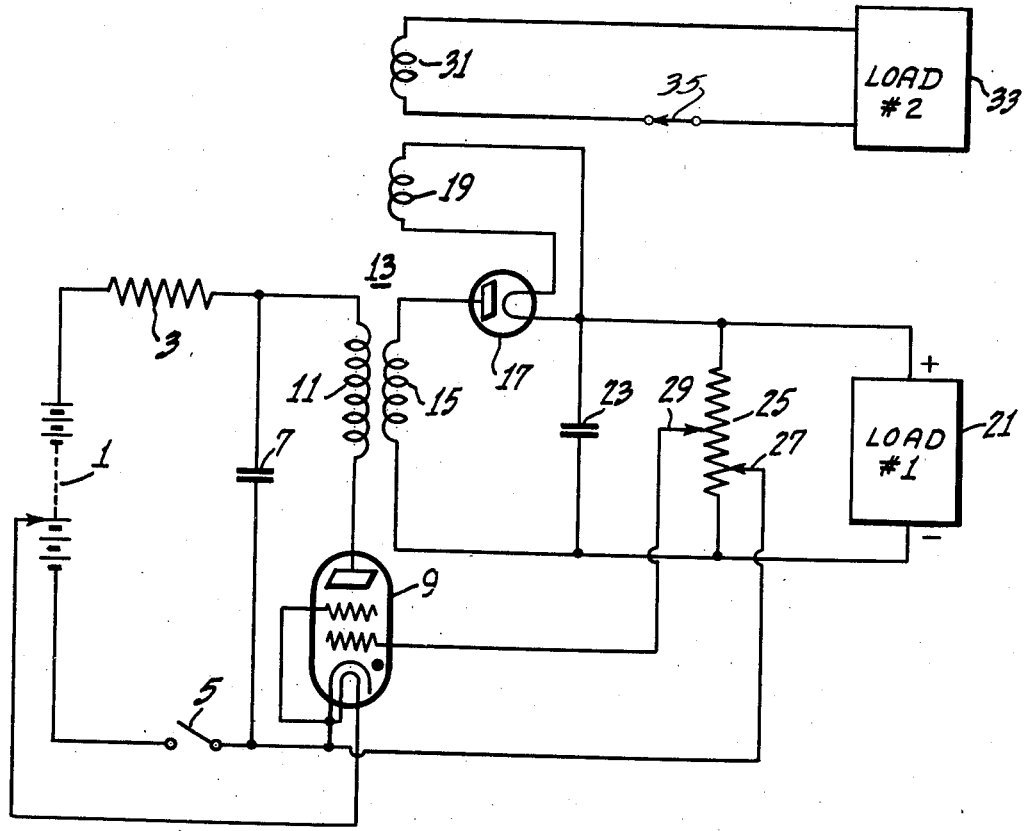
Inventor
ROBERT R. THALNER
By
Attorney Patented July 5, 1949

2,475,063

UNITED STATES PATENT OFFICE 2,475,063

REGULATED HIGH-VOLTAGE APPARATUS

Robert R. Thalner, Princeton, N. J., assignor to Radio Corporation of America, a corporation of Delaware Application February 24, 1944, Serial No. 523,733

9 Claims. (Cl. 171—97)

This invention relates generally to voltage regulated electrical power apparatus and more particularly to improved means for generating relatively high alternating potentials from a relatively low direct voltage source, means for rectifying said high potentials and means for regulating said generated potentials.

Heretofore, various types of mechanically vibratile generators have been employed to provide the required relatively high direct voltages essential for operating radio apparatus from a low direct voltage source. Vibratile generating apparatus is extensively employed in the power supply circuits of conventional automobile radio receivers and other portable apparatus wherein a common low voltage battery is employed to provide all necessary circuit operating voltages. Such vibratile generating or rectifying apparatus requires careful adjustment and maintenance of the necessary vibrating contacts, and produces objectionable radio interference signals which must be shielded from the balance of the radio receiver apparatus.

The instant invention contemplates the use of a grid-controlled gaseous discharge tube connected as a relaxation oscillator to provide pulsating currents in response to a direct voltage source. The pulsating currents are applied, through a voltage step-up transformer, to provide relatively high alternating potentials which are rectified and filtered to provide the desired high direct voltages required for electronic apparatus. A portion of the rectified relatively high direct voltage thus obtainable is applied to a control electrode of the relaxation oscillator tube to regulate degeneratively the magnitude of the generated oscillations and hence to control the magnitude of the rectified output direct voltage. If desired, additional low voltage secondary windings may be included on the transformer to provide low voltage alternating currents for energizing tube heater elements in the load circuit. A low voltage secondary winding of the transformer is employed to energize the cathode of the rectifier tube interposed between the transformer high voltage secondary winding and the load. The cathode of the gaseous discharge relaxation oscillator tube is energized directly from the driving direct voltage source.

Among the objects of the invention are to provide an improved method of and means for generating relatively high direct voltages from a relatively low direct voltage source. Another object of the invention is to provide an improved method of and means for generating alternating potentials in response to a direct voltage source, rectifying said alternating potentials and applying a portion of said rectified potentials to control the voltage magnitude of said generated alternating potentials. A further object of the invention is to provide improved means for generating relatively high direct potentials by energizing a relaxation oscillator from a direct voltage source, deriving alternating voltages from said oscillator, rectifying said alternating voltages and applying a portion of said rectifying voltages to control the voltage magnitudes of said generated oscillations. An additional object of the invention is to provide an improved method of and means for deriving relatively high direct voltages and relatively low alternating voltages for operating electrical apparatus from a relatively low direct voltage source.

The invention will be described in further detail by reference to the accompanying drawing of which the single figure thereof is a schematic circuit diagram of a preferred embodiment.

Referring to the drawing, a relatively low direct voltage source, such, for example, as a battery 1, is serially connected through a resistor 3 and a switch 5 to charge a capacitor 7. One terminal of the capacitor 7 is connected to the cathode of a grid-controlled gaseous discharge tetrode or pentode 9. The remaining terminal of the capacitor 7 is connected through the primary winding 11 of a transformer 13 to the anode of the gaseous discharge tube 9. The screen electrode of the gaseous discharge tube 9 is connected to the cathode thereof. One terminal of the heater element of said tube is connected to the cathode thereof, and the remaining heater terminal is connected to an intermediate point on the direct voltage source 1 to provide proper voltage for energizing said cathode. It should be understood that the direct voltage source 1 should provide at least sufficient voltage to provide a current discharge through, or fire, the particular gaseous discharge tube employed. For example, 15 volts is sufficient to fire many of the gaseous discharge tubes in common use.

One terminal of a high voltage secondary winding 15 of the transformer 13 is connected to the anode of a diode rectifier tube 17. The cathode of the diode rectifier tube 17 is energized by alternating currents derived from a low voltage secondary winding 19 of the transformer 13. The cathode of the diode rectifier tube 17 is connected to the positive terminal of a load device 21 such, for example, as the anode or screen electrode circuits of a conventional radio receiver or cathode ray device. The remaining terminal of the high voltage secondary winding 15 of the transformer 13 is connected to the negative terminal of the load device 21.

The rectified high voltages derived from the diode rectifier 17 are filtered by means of a filter capacitor 23 connected between the cathode of the rectifier tube 17 and the negative terminal of the load device 21. A voltage divider 25, connected in parallel with the filter capacitor 23 and the load device 21, has a first adjustable tap 27, which is connected to the cathode of the gaseous discharge tube 9, and a second adjustable tap 29, which is connected to the control electrode of said gaseous discharge tube.

In operation, when the switch 5 is closed, the heater element of the gaseous discharge tube 9 is energized to provide electronic emission from the cathode electrode thereof. Simultaneously, the capacitor 7 is charged through the resistor 3 to the voltage provided by the direct voltage source 1. If it is assumed that the gaseous discharge tube 9 initially is in a non-conducting condition, the potential between the anode electrode and the cathode thereof will increase until it reaches a value sufficient to provide a current discharge from anode to cathode. The current discharge will discharge the capacitor 7 until its voltage reaches a value no longer sufficient to sustain the current discharge through the tube. When the current discharge through the tube ceases, the charge upon the capacitor 7 again increases until the voltage between the tube anode and cathode is sufficient to again initiate a current discharge therebetween.

The current pulses thus applied to the primary winding of the transformer 13 provide relatively high alternating potentials across the terminals of the secondary winding 15, which are rectified by the diode rectifier 17, filtered by the filter capacitor 23 and applied as a relatively high direct potential to the load device 21.

By proper adjustment of the adjustable taps 27, 29 on the voltage divider 25, a desired portion of the load voltage may be applied to bias the control electrode of the gaseous discharge tube 9 to determine the magnitude of the oscillations generated thereby. The bias circuit thus provided controls effectively the load voltage within extremely narrow ranges, since an increase in load voltage provides an increased positive bias voltage on the control electrode of the oscillator tube 9 which decreases the required anode voltage at which a current discharge occurs between anode and cathode, thereby correspondingly reducing the magnitude of the oscillation pulses, with a resultant decrease in the magnitude of the rectified high voltage applied to the load.

The degenerative feedback voltages thus provided control rapidly the voltage applied to the load 21 to compensate for variations in the generating and rectifying circuits. The output voltage applied to the load may be varied over a considerable range by adjustment of the adjustable taps 27, 29 on the voltage divider 25.

If desired, an additional low voltage secondary winding 31 may be provided on the transformer 13 to provide low voltage alternating currents for a second load 33 such, for example, as the heater elements of associated radio or electrical apparatus. The degenerative feedback voltage control circuit thus described also provides effective regulation of the alternating potentials which may be applied through a switch 35 to the second load 33, since any increase in the voltage across the first load 21 provides a corresponding decrease in the alternating potentials derived from the transformer 13.

Thus the invention described comprises an improved method of and means for generating alternating potentials, rectifying said potentials and applying said rectified potentials to a load device, wherein all generating and rectifying circuit elements are energized from a common, relatively low, direct voltage source, and wherein a portion of the load voltage is degeneratively applied to the alternating voltage generator device to compensate for variations in said load voltage.

I claim as my invention:

1. A voltage regulated power supply source for a load comprising a source of direct voltage, a capacitor charged by said voltage, a gaseous discharge tube having an anode, a cathode and at least one control electrode, means for applying said direct voltage between said anode and cathode electrodes of said tube to provide pulsating current discharges of said capacitor between said anode and said cathode, means responsive to said capacitor current discharges for deriving at least one alternating voltage, means for rectifying said alternating voltage, means for applying said rectified voltage to said load, and means for applying a portion of said load voltage as a bias voltage to a control electrode of said gaseous discharge tube to regulate said oscillatory current discharges and hence said load voltage.

2. A voltage regulated power supply source for a load comprising connection means for a source of direct voltage, a capacitor charged by said voltage, a gaseous discharge tube having an anode, a cathode and at least one control electrode, means for applying said direct voltage between said anode and cathode electrodes of said tube to provide pulsating current discharges of said capacitor between said anode and said cathode, means responsive to said capacitor current discharges for deriving at least one alternating voltage, means for rectifying said alternating voltage, means for applying said rectified voltage to said load, and degenerative means for applying a portion of said load voltage as a bias voltage to a control electrode of said gaseous discharge tube to regulate said oscillatory current discharges and hence said load voltage.

3. A voltage regulated power supply source for a load comprising connection means for a source of direct voltage, a capacitor charged by said voltage, a gaseous discharge tube having an anode, a cathode and at least one control electrode, means for applying said direct voltage between said anode and cathode electrodes of said tube to provide pulsating current discharges of said capacitor between said anode and said cathode, transformer means responsive to said capacitor current discharges for deriving at least one alternating voltage, means for rectifying said alternating voltage, means for applying said rectified voltage to said load, and means for applying a portion of said load voltage as a bias voltage to a control electrode of said gaseous discharge tube to regulate said oscillatory current discharges and hence said load voltage.

4. A voltage regulated power supply source for a load comprising connection means for a source of direct voltage, a capacitor charged by said voltage, a gaseous discharge tube having an anode, a cathode and at least one control electrode, means for applying said direct voltage between said anode and cathode electrodes of said tube to provide pulsating current discharges of said capacitor between said anode and said cathode, transformer means responsive to said capacitor current discharges for deriving at least one alternating voltage, means including a thermionic rectifier tube having its cathode energized by one of said alternating voltages for rectifying another of said alternating voltages, means for applying said rectified voltage to said load, and means for applying a portion of said load voltage as a bias voltage to a control electrode of said gaseous discharge tube to regulate said oscillatory current discharges and hence said load voltage.

5. A voltage regulated power supply source for a load comprising connection means for a source of direct voltage, a capacitor charged by said voltage, a gaseous discharge tube having an anode, a cathode and at least one control electrode, means for applying said direct voltage between said anode and cathode electrodes of said tube to provide pulsating current discharges of said capacitor between said anode and said cathode, means responsive to said capacitor current discharges for deriving at least one alternating voltage, means for rectifying said alternating voltage, means for applying said rectified voltage to said load, and means for applying a portion of said load voltage as a bias voltage to a control electrode of said gaseous discharge tube to regulate said oscillatory current discharges and hence said load voltage.

6. A voltage regulated power supply source for a load comprising connection means for a source of direct voltage, a gaseous discharge tube having an anode, a cathode and at least one control electrode, means including a capacitor normally charged by said direct voltage for applying said direct voltage between said anode and cathode electrodes of said tube to provide pulsating current discharges of said capacitor between said anode and said cathode, means responsive to said capacitor current discharges for deriving at least one alternating voltage, means for rectifying said alternating voltage, means for applying said rectified voltage to said load, and means for applying a portion of said load voltage as a bias voltage to a control electrode of said gaseous discharge tube to regulate said oscillatory current discharges and hence said load voltage.

7. Apparatus of the type described in claim 1 including means for filtering said rectified voltage.

8. Apparatus of the type described in claim 4 including a second load, and means for applying another of said derived alternating voltages to said second load.

9. Apparatus of the type described in claim 1 including means for adjusting said bias voltage.

ROBERT R. THALNER.

REFERENCES CITED

The following references are of record in the file of this patent:

UNITED STATES PATENTS

| Number | Name | Date |
|---|---|---|
| 2,138,138 | Bruckner | Nov. 29, 1938 |
| 2,227,815 | Toulon | Jan. 7, 1941 |
| 2,282,340 | Pieplow | May 12, 1942 |
| 2,343,539 | Edson | Mar. 7, 1944 |

FOREIGN PATENTS

| Number | Country | Date |
|---|---|---|
| 426,002 | Great Britain | Mar. 26, 1935 |
| 554,468 | Great Britain | July 6, 1943 |